(12) United States Patent
Buhler et al.

(10) Patent No.: US 7,368,143 B2
(45) Date of Patent: May 6, 2008

(54) LOW-CALORIE LOW-FAT BUTTER-FLAVORED TOPPING COMPOSITIONS AND METHODS OF PREPARATION

(75) Inventors: Allen C. Buhler, Racine, WI (US); Arthur P. Hansen, Garner, NC (US)

(73) Assignee: Cumberland Packing Corporation, Brooklyn, NY (US)

( * ) Notice: Subject to any disclaimer, the term of this patent is extended or adjusted under 35 U.S.C. 154(b) by 502 days.

(21) Appl. No.: 10/646,609

(22) Filed: Aug. 22, 2003

(65) Prior Publication Data

US 2005/0042351 A1 Feb. 24, 2005

(51) Int. Cl.
*A23L 1/29* (2006.01)
(52) U.S. Cl. ...................... 426/564; 426/570
(58) Field of Classification Search ........ 426/564–565, 426/570
See application file for complete search history.

(56) References Cited

U.S. PATENT DOCUMENTS

| | | | | |
|---|---|---|---|---|
| 2,831,775 | A | * | 4/1958 | Kocher .................. 426/540 |
| 2,883,286 | A | * | 4/1959 | Musser .................. 426/570 |
| 3,224,883 | A | | 12/1965 | Pader et al. |
| 3,230,091 | A | * | 1/1966 | Thompson ............... 426/116 |
| 3,763,900 | A | * | 10/1973 | Solms-Baruth et al. ......... 141/3 |
| 3,944,680 | A | | 3/1976 | van Pelt et al. |
| 4,001,437 | A | | 1/1977 | Jaeggi et al. |
| 4,071,634 | A | | 1/1978 | Wilton et al. |
| 4,112,132 | A | | 9/1978 | Badertscher et al. |
| 4,156,021 | A | | 5/1979 | Richardson |
| 4,199,608 | A | | 4/1980 | Gilmore et al. |
| 4,208,444 | A | | 6/1980 | Gilmore et al. |
| 4,251,560 | A | * | 2/1981 | Dell et al. .................. 426/565 |
| 4,279,941 | A | | 7/1981 | Bosco et al. |
| 4,343,825 | A | | 8/1982 | Takada et al. |
| 4,451,492 | A | * | 5/1984 | Dell et al. .................. 426/564 |
| 4,844,921 | A | | 7/1989 | Bakal et al. |
| 4,851,239 | A | | 7/1989 | Amen et al. |
| 5,609,904 | A | | 3/1997 | Koh et al. |
| 5,759,609 | A | * | 6/1998 | Lynch .................. 426/570 |
| 5,869,125 | A | | 2/1999 | Lynch et al. |
| 6,025,005 | A | * | 2/2000 | Pickenhagen et al. ...... 426/535 |
| 6,210,743 | B1 | | 4/2001 | Clapp et al. |
| 6,258,397 | B1 | | 7/2001 | Flynn |
| 6,340,491 | B1 | | 1/2002 | Cain et al. |
| 6,365,211 | B1 | | 4/2002 | Corrigan |
| 6,372,280 | B1 | * | 4/2002 | Gonsalves et al. .......... 426/564 |
| 6,503,553 | B1 | | 1/2003 | Flynn |
| 6,551,636 | B2 | | 4/2003 | Chen |
| 6,582,749 | B2 | | 6/2003 | Merrick et al. |

FOREIGN PATENT DOCUMENTS

RU 2180177 * 3/2002

* cited by examiner

*Primary Examiner*—Keith D. Hendricks
*Assistant Examiner*—Jyoti Chawla
(74) *Attorney, Agent, or Firm*—Jansson Shupe & Munger Ltd.

(57) ABSTRACT

A low-calorie low-fat butter-flavored topping composition and methods of preparation are disclosed. The topping composition exhibits overrun of between about 250%-350% and has a fat content of less than about 16% and a water content of more than about 50% water. In addition, the composition is preferably packaged in an aerosol container and stands up for at least 10 minutes at room temperature after being emitted from the aerosol container. Normal operation of the aerosol container allows removal of over 90% of the composition from the aerosol container.

42 Claims, No Drawings

LOW-CALORIE LOW-FAT BUTTER-FLAVORED TOPPING COMPOSITIONS AND METHODS OF PREPARATION

FIELD OF THE INVENTION

This invention relates generally to topping compositions which are suitable as butter and/or margarine substitutes, and in particular, to such compositions packaged in aerosol containers.

BACKGROUND OF THE INVENTION

A large percentage of consumers attempt to control their weight and levels of body fat through control of caloric and fat intake. In addition, many consumers try to reduce their existing cholesterol level through reduced cholesterol intake. Butter and margarine are both significant sources of fat and calories and butter is a significant source of cholesterol.

Butter contains a high level of animal fat (about 80 to 82%) which many consumers find unacceptable. Margarine is usually produced from an emulsion of oils and fats derived from vegetables. Since margarines are derived from vegetable fats they are cholesterol free, however, margarine contains the same amount of fat as butter.

Attempts have been made to reduce the fat content in butter-like and margarine-like products. For example, the proportion of the fat in butter can be replaced by vegetable fats, which are considered to be nutritionally more acceptable than animal fats. Substitution of some or all of the animal fat with vegetable fat to produce a lower cholesterol butter has the added benefit of softening the end product and making it more spreadable.

However, low calorie, reduced fat margarine-like and butter-like products have not met with consumer expectations since they are not stable and since the caloric and fat reductions are not sufficient. Therefore, there is a need for improved butter-flavored toppings which have sufficient taste and low caloric and fat content, and which are sufficiently stable for typical use.

In addition to having health concerns regarding levels of caloric and fat content, many consumers desire increased ease of use of and improved storage of butter or butter-flavored toppings. For instance, normal use of conventional spreadable butter or butter-flavored toppings requires the user to remove a serving from a container. Such removal typically requires contact between the remaining butter or butter-flavored topping and often results in contamination of the remaining butter or butter-flavored topping. A butter-flavored topping which is packaged so as to prevent such contamination is an improvement over conventional butter and butter-flavored toppings.

Furthermore, use of conventional butter or butter-flavored toppings requires opening the container, using a utensil to remove a serving, spreading the serving, closing the container and cleaning or disposing of the utensil. Such a process is aggravated if the topping is too hard or too soft and is difficult to remove or spread. A butter-flavored topping which can be delivered more easily is an improvement over conventional butter and butter-flavored toppings.

Therefore, an improved butter-flavored topping and method of preparation thereof which addresses the problems of known butter-like and margarine-like toppings would be an important advance in the art.

OBJECTS OF THE INVENTION

It is an object of the invention to provide a butter-flavored topping composition having a fat content of less than about 16%.

Another object of the invention is to provide a butter-flavored topping composition which has sufficient stability to stand up for ten minutes at room temperature after being emitted from an aerosol container.

Another object of the invention is to provide a butter-flavored topping composition which has a water content of more than 50%.

Another object of the invention is to provide a butter-flavored topping composition which has flavor strength equivalent to butter and five times less fat than butter.

Another object of the invention is to provide a method of producing butter-flavored topping composition for use in aerosol containers.

Another object of the invention is to provide a butter-flavored topping composition packaged in an aerosol container and of which over 90% may be removed from normal operation of the aerosol container.

Still another object of the invention is to provide a method of producing butter-flavored topping composition which provides that operation of the aerosol container allows removal of over 90% of the composition.

Yet another object of the invention is to provide butter flavoring providing flavor strength at least twice that of conventional butter.

How these and other objects are accomplished will be apparent from the following descriptions.

SUMMARY OF THE INVENTION

This invention is an improved low-calorie low-fat butter-flavored topping composition and method of preparation thereof. The invention represents a significant advance over the state of the art by utilizing novel components, combinations of components and amounts of components and producing effective topping compositions.

The low-calorie low-fat butter-flavored topping composition comprises more than about 50% by weight water and less than about 16% by weight fat and exhibits between about 250-350% overrun. The composition is preferably packaged in an aerosol container and stands up for at least 10 minutes at room temperature after being emitted from the aerosol container. Normal operation of the aerosol container, i.e., pressing or tilting the nozzle of the aerosol container, preferably allows removal of over 90% of the composition. The composition is preferably pressurized with nitrous oxide in the aerosol container.

When water-based, the low-calorie low-fat butter-flavored topping composition consists essentially of or comprises over 50% by weight water, between about 13-16% by weight fat (preferably coconut fat with a melting point of about 92° F.), between about 10-16% by weight bulking agent (preferably starch hydrolyzates), between about 1-5% by weight milk powder, between about 1-5% by weight protein (preferably cheese whey or hydrogenated soy powder), and less than about 1% by weight flavoring. It is most preferred that the bulking agent be a hydrolysed corn starch with a DE of about 10. The flavoring is preferably comprised of about 46% by weight propylene glycol, about 25.5% by weight lactic acid, about 20.2% by weight acetoin, about 4.2% by weight butyric acid, about 2.6% by weight diacetyl, about 0.8% by weight maltol, and about 0.7% by weight gamma-nonalactone.

In certain preferred embodiments the water-based topping composition consists essentially of or comprises over 60% by weight water, between about 14-15% by weight fat, between about 12-14% by weight bulking agent, between about 2-3% by weight milk powder, between about 2-3% by weight protein, and between about 0.03-0.06% by weight flavoring. More preferably, the water-based topping composition consists essentially of or comprises about 66% by weight water, about 14% by weight fat, about 12% by weight bulking agent, about 2.6% by weight milk powder, about 2.6% by weight protein, and between about 0.04-0.05% by weight flavoring.

The preferred water-based topping composition may further comprise less than about 1% by weight nonionic lipophilic emulsifier (most preferably DURTAN™ 60 sorbitan monostearate), less than about 1% by weight nonionic hydrophilic emulsifier (most preferably polysorbate 60), less than about 1% by weight other emulsifier (most preferably monodiglyceride), less than about 1% by weight lecithin, less than about 1% by weight cellulose gel (most preferably microcrystalline cellulose), between about 1-2% by weight salt, and less than about 1% by weight coloring (most preferably annatto). Such further components are more preferably about 0.37% by weight cellulose gel, about 0.297% by weight nonionic lipophilic emulsifier, about 0.053% by weight nonionic hydrophilic emulsifier, about 0.053% by weight lecithin, about 0.095% by weight other emulsifier, about 1.71% by weight salt, and about 0.03% by weight coloring.

When milk-based, the low-calorie low-fat butter-flavored topping composition consists essentially of or comprises over 40% by weight whole milk (3.2% fat), over 25% by weight heavy cream (38% fat), between about 10-16% by weight bulking agent (preferably starch hydrolyzates, most preferably a hydrolyzed corn starch with a DE of about 10), and less than about 1% by weight flavoring. Such a milk-based topping composition is preferably comprised of less than 15% by weight fat, or more specifically by about 14.23% fat. The milk-based topping composition preferably comprises 71.57% water from the whole milk and heavy cream.

The preferred flavoring is comprised of about 46% by weight propylene glycol, about 25.5% by weight lactic acid, about 20.2% by weight acetoin, about 4.2% by weight butyric acid, about 2.6% by weight diacetyl, about 0.8% by weight maltol, and about 0.7% by weight gamma-nonalactone.

More preferably, the milk-based topping composition consists essentially of or comprises over 50% by weight whole milk, over 30% by weight heavy cream, between about 11-13% by weight bulking agent, and between about 0.03-0.05% by weight flavoring. Most preferably, the milk-based topping composition consists essentially of or comprises about 52.8% by weight whole milk, about 33% by weight heavy cream, about 12% by weight bulking agent, and about 0.04% by weight flavoring.

In certain embodiments, the preferred milk-based topping composition further comprises less than about 2% by weight salt, less than about 1% by weight cellulose gel (preferably microcrystalline cellulose), less than about 0.5% by weight lecithin, and less than about 0.5% by weight coloring. Such further components are more preferably about 1.7% by weight salt, about 0.37% by weight cellulose gel, about 0.05% by weight lecithin, and about 0.03% by weight coloring (preferably annatto).

The invention is also described as a water-based low-calorie low-fat butter-flavored topping composition comprising over 50% by weight water, between about 13-16% by weight by weight fat, between about 10-16% by weight bulking agent, between about 1-5% by weight milk powder, between about 1-5% by weight protein, and less than about 1% by weight flavoring. Such a water-based topping composition exhibits between about 250-350% overrun and preferably stands up for at least 10 minutes at room temperature after being emitted from an aerosol container.

The invention may also be described as a milk-based low-calorie low-fat butter-flavored topping composition comprising over 40% by weight whole milk, over 25% by weight heavy cream, between about 10-16% by weight bulking agent, and less than about 1% by weight flavoring. Such a milk-based topping composition exhibits between about 250-350% overrun and preferably stands up for at least 10 minutes at room temperature after being emitted from an aerosol container.

The invention further includes a method of preparing a water-based low-calorie low-fat butter-flavored topping composition. Such method comprises forming a first mixture by blending less than about 1 part cellulose gel (preferably microcrystalline cellulose) with about_-_parts water to form hydrated gel, mixing in about 1-5 parts milk powder, mixing in about 1-5 parts protein (preferably cheese whey or hydrogenated soy powder), mixing in about_-_parts water, mixing in about 10-16 parts bulking agent (preferably starch hydrolyzates), and heating the first mixture to over 100° F. (preferably to about 130° F.); forming a second mixture by melting about 13-16 parts fat (preferably coconut fat), and mixing in less than about 1 part nonionic lipophilic emulsifier (preferably Duratan™ 60), less than about 1 part nonionic hydrophilic emulsifier (preferably polysorbate 60), less than about 1 part lecithin and less than about 1 part other emulsifier (preferably monodiglyceride) into the fat; mixing the first mixture and the second mixture to form the composition; adding less than about 2 parts salt and less than about 1 part flavoring to the composition; pasteurizing the composition; cooling the composition to less than 50° F. (preferably to about 40° F. or to about 35° F.); and packaging the composition. The method preferably further includes adding coloring (preferably annatto) to the composition before pasteurizing.

The composition is preferably packaged in an aerosol container such that operation of the aerosol container allows removal of over 90% of the composition. Such packaging preferably includes pressurizing the composition with nitrous oxide.

The invention further includes a method of preparing a water-based low-calorie low-fat butter-flavored topping composition. Such method comprises forming a first mixture by blending less than about 1 part cellulose gel (preferably microcrystalline cellulose) with water to form a hydrated gel, mixing in about 1-5 parts milk powder, mixing in about 1-5 parts protein (preferably cheese whey or hydrogenated soy powder), mixing in the balance of the water, mixing in about 10-16 parts bulking agent (preferably starch hydrolyzates), and heating the first mixture to over 100° F. (preferably to about 130° F.); forming a second mixture by melting about 13-16 parts fat (preferably coconut fat), and mixing in less than about 1 part nonionic lipophilic emulsifier (preferably DURTAN™ 60), less than about 1 part nonionic hydrophilic emulsifier (preferably polysorbate 60), less than about 1 part lecithin and less than about 1 part other emulsifier (preferably monodiglyceride) into the fat; mixing the first mixture and the second mixture to form the composition; adding less than about 2 parts salt and less than about 1 part flavoring to the composition; pasteurizing the composition; cooling the composition to less than 50° F. (preferably to about 40° F. or to about 35° F.); and packaging the composition. The method preferably further includes adding coloring (preferably annatto) to the composition before pasteurizing.

In preferred embodiments, the method utilizes about 52.8 parts whole milk, about 0.37 parts cellulose gel, about 12 parts bulking agent, about 33 parts heavy cream, about 0.05 parts lecithin, about 1.7 parts salt, about 0.03 parts coloring (preferably annatto), and about 0.04 parts flavoring.

Packaging preferably includes filling a container with the composition, injecting nitrous oxide into the container and shaking the container to disperse the nitrous oxide. The container is preferably 14 ounces and is filled with 396 grams of the composition. Packaging preferably allows normal operation of the container to result in removal of over 90% of the composition. After packaging, the container may be allowed to stand for 24 hours at 40° F.

DETAILED DESCRIPTION OF PREFERRED EMBODIMENTS

As stated above, the invention eliminates some of the inconvenience in utilizing conventional butter. For instance, because the topping is hermetically sealed in a pressurized container, normal use does not expose the topping to contamination (as opposed to normal use of conventional butter). In addition, stability is extended under refrigeration. Furthermore, the release of a portion or serving of the topping is easy to control and is much quicker than when using conventional butter. Also, the amount of water employed in forming the water-out emulsion of the topping is approximately three times the amount of water present in conventional butter. Therefore, the number of calories per gram of topping composition is substantially less than in conventional butter.

To provide for use with an aerosol container, several performance requirements must be observed. The individual portion or serving must maintain its structure and stand up for at least ten minutes at room temperature (approximately 72° F.) after being emitted from the aerosol container. In addition, the topping composition must be a strong emulsion such that it withstands water.

The topping composition must further have substantial body and texture acceptable and satisfactory for a dietetic product. The formulation of the inventive topping compositions herein enable them to be whipped with a significant amount of air to attain the desired low specific gravity. The cream industry typically describes the amount of air in a product as "overrun." This term measures the percentage by which the volume of the liquid mix for a product is increased during whipping and freezing. Thus, when one gallon of mix produces two gallons of finished product, the overrun is 100%. The overrun of the topping compositions of the present invention typically lies between about 250-350%.

In developing the water-based topping composition, different types of emulsifiers were tested with milk powder to produce a stable butter-flavored topping composition for aerosol delivery. The emulsifier system has to produce enough overrun (between about 250-350%), yet not allow the topping composition to collapse once it is dispensed from the aerosol container.

A wide variety of emulsifiers may be employed in amounts from about 0.02% to less than about 4%. The emulsifiers induce the formation of a stable emulsion and improve the rate and total aeration obtained. Among the preferred emulsifiers are: lecithin; monodiglycerides of fatty acids; polysorbate, and DURTAN™ 60. It has been found to be desirable to provide a controlled hydrophilic-lipophilic balance (HLB) as with a lipophilic emulsifier such as DURTAN™ 60 sorbitan monostearate and/or lecithin with a hydrophilic material such as polysorbate 60.

Polysorbate 60 is a nonionic, highly hydrophilic emulsifier which is used for increased volume and stiffness in whipped toppings with overrun. Polysorbate is also referred to as polyethylene sorbitan monostearate. In addition to volume and stiffness concerns, polysorbate affects emulsion stability, viscosity, plasticity and freeze-thaw stability. The preferred polysorbate is DURFAX 60™. (originally registered as a trademark by SCM Corp., of Cleveland, Ohio).

DURTAN™ 60 is a nonionic, oil dispensable, highly lipophilic emulsifier which is often used with other emulsifiers to enhance gloss retention and is used in a variety of vegetable and dairy products.

Other emulsifiers used in the water-based topping composition include food grade mono and diglycerides from vegetable oil, with citric acid to protect flavor. The preferred emulsifier is DUREM 117™ which is often used in margarines, whipped topping and other vegetable dairy systems. DUREM 117™, originally registered as a trademark of SCM Corp., is a monodiglyceride made from 0-5 I.V. soybean oil (monoglyceride 40-48%, diglyceride 40-48%, triglyceride 8-12%).

DURFAX 60™ and DURTAN™ 60 can be used together in the water-based topping composition for a total maximum combined level of 1.04%. DURFAX 60™ is preferably used up to 77% of the mixture and DURTAN™ 60 is preferably used up to 27% of the mixture.

Lecithin is used both in the water-based and milk-based topping composition. Lecithin is a multifunctional, flexible and versatile surfactant composed of a number of compounds, predominantly phospholipid, which exhibit their own unique physical and chemical properties under their own optimum conditions. Lecithin is utilized in a wide variety of food and industrial applications and typically comes from soy or egg yolk. It is preferred that the lecithin utilized in the topping composition is soy based. Lecithin functions as an emulsifier, release agent, fat replacer/extender and dispersing aid.

The fat in each of the topping compositions provides stability and helps retain flavor. Milk fat is the preferred fat in the milk-based topping composition and is supplied by whole milk (which is preferably 3.2% fat) and heavy cream (which is preferably 38% fat). The milk-based topping composition is preferably about 14.23% fat. The fat in the water-based topping composition is preferably partially hydrogenated coconut fat and preferably melts at 92° F. The fat should not melt at less than 90° F. in order to maintain foam. The preferred coconut fat is Ultimate® 92 coconut oil which is a product of Cargill Foods of Minneapolis, Minn.

For the water-based topping composition different types of fats were evaluated for use with the selected emulsifier system. Fats with melting points from 72° F. to 112° F. were tested. The higher melting point fats produced a drier, firmer topping composition, but were hard to remove from the aerosol container. There tended to remain four ounces of topping composition (usually 15-28 grams) in a sixteen-ounce container after dispensing topping compositions with higher melting point fats. This was cost prohibitive so fats with lower melting points were tested at different concentrations (from 14%-24%). Using a lower melting point fat at 14% resulting in a stable topping composition emulsifier and allowed for substantially all of the topping composition to be removed from an aerosol container.

Achieving lower fat content in the topping compositions was aided by the addition of a bulking agent which tended to hydrate the water which was added to make the water-based topping composition or present in the milk in the milk-based topping composition. The bulking agent provides thickening by absorbing water, gives the composition more structure and makes the composition drier to allow it to stand up longer after being released from a container. In this manner, the bulking agent acts as a substitute for the eliminated fat content.

It has been determined that use of only 10% bulking agent in the composition is not effective in achieving sufficient structure and dryness. Likewise, it has been found that use of at least 16% bulking agent in the composition results in difficult in removal of the composition from an aerosol container. Therefore, it is preferred that the bulking agent comprise between 10-16% bulking agent.

The preferred bulking agent is syrup solids or starch hydrolyzates, and more particularly, low D.E. (dextrose equivalent) starch hydrolyzates (those having a narrow molecular weight range of glucose polymers). The starch hydrolyzates with dextrose equivalent values below 25 are commonly referred to in the art as maltodextrins and are commercially available as MALTRIN® (a registered trade mark of Grain Processing Co., of Muscatine, Iowa). For use in this invention, starch hydrolyzates having D.E. values of 10 (as found in the hydrolyzed corn starch MALTRIN® 10) are preferred. The reason for this preference is that maltodextrins having higher D.E. values may impart a slight sweetness which may be objectionable in a low calorie topping, and also with the higher D.E. maltodextrins there is a greater tendency for syneresis to occur, that is, separation of the aqueous phase following initial preparation of the topping.

Cellulose gel, typically derived from cellulose in fruits and vegetables, is used in both the water-based and milk-based topping compositions. The cellulose gel acts as a stabilizer in each composition. In addition, the cellulose gel makes the topping composition look drier, stiffer and less shiny and gives the topping composition increased heat stability/resistance to melt, superior freeze/thaw resistance and more resistance to collapse after application.

The preferred cellulose gel is microcrystalline cellulose which, when in water with shear, forms a three-dimensional matrix comprised of millions of insoluble microcrystals that form an extremely stable, thixotropic gel. The preferred microcrystalline cellulose is Avicel™ RC-591 which is marketed by FMC BioPolymer, of Philadelphia, Pa. Avicel™ RC-591 is a water insoluble dispersible colloidal excipient used in the preparation of emulsions. It provides a structured dispersion vehicle exhibiting a high degree of thixotropy, yielding superior suspension stability in a formulation. Avicel™ RC-591 dispersions yield a highly thixotropic vehicle, which is primarily the result of the large number of colloidal microcrystal particles that result from full dispersion in aqueous media.

The proteins in the water-based topping composition bind water, help structure and increase opacity of the composition. The preferred proteins are whey or hydrogenated soy powder. Whey is a by-product of the production of cheese. Whey may be derived from virtually any cheese source including Swiss cheese, cheddar cheese, mozzarella cheese, and the like. Proteins such as cheese whey are used for dairy flavor in the water-based topping composition. Whey proteins exhibit good foaming properties including whippability and, among the evaluated substances, have been determined to produce the most overrun in the topping composition. Denatured whey protein and natural whey protein each perform well in the water-based topping composition.

The milk powder of the water-based topping composition produces a good milk or dairy cream flavor in the topping composition due to colloidal casein therein. In addition, the milk powder provides opacity to the composition. Titanium dioxide could also be used to provide opacity. The milk powder is also a good whipping agent and gives body to the composition and provides a stabilizing effect. In addition, the milk powder can be used in greater amounts to replace the proteins, i.e., the whey or soy powder.

Other components of the topping compositions include annatto color, salt and natural butter flavoring. In addition, the water-based topping composition includes a large amount of additional water. Water is provided by the whole milk and heavy cream in the milk-based topping composition.

The natural butter flavoring provides a strong butter flavor which is free of artificial and off-flavor notes. The flavor is homogeneously distributed within the topping compositions, yet is available to the taste buds during consumption. Still further, the flavor is stable upon storage of the topping under refrigeration for periods of up to six months and is stable upon heating and during processing.

The butter flavoring used in the invention may come from a variety of flavoring compounds. Such a butter flavoring includes flavoring components comprising the group of fatty acids, esters of such acids, ketones, lactones, furanones, aldehydes, organic acids, and aromatic compounds that impart butter flavor. The preferred lactone is gamma-nonalactone. The preferred ketone is diacetyl. The preferred fatty acid is butyric acid. Other preferred flavorings are acetoin, maltol and lactic acid. The preferred butter flavor is imparted by the following composition: ganima-nonalactone (0.7%), diacetyl (2.6%), butyric acid (4.2%), acetoin (20.2%), maltol (0.8%), lactic acid (25.5%) and propylene glycol (46%).

The preferred method of preparing the butter flavoring includes dissolving the acetoin and maltol in the propylene glycol (preferably with heat to melt the components), then cooling the solution to room temperature before mixing in the remaining components.

The preferred method of producing the water-based topping composition is as follows: a first portion of water at 110° F. is put in a high shear Breddo liquefier and blended with AVICEL™ RC-591 for 7-10 minutes to activate the cellulose of the AVICEL™ in 4-5 micron particles in order to stabilize the fat micelles and simulate fat. Then the milk powder and cheese whey are blended in at a slower speed until completely dissolved. The balance of water is then added along with the MALTRIN® 10. The composition is then slowly heated to about 130° F.

At the same time ULTIMATE® 92 coconut fat is melted and the emulsifiers are weighed into a portion of the fat. Then the emulsifier-added portion of the fat is blended into the rest of the fat and poured into the heated mixture of milk solids and Avicel™. As heating is continued, salt and annatto color are added. The composition is mixed on slow speed in a tank with an agitator and heated to 170° F. for 30 minutes for batch pasteurization, to 175° F. for 25 seconds for HTST pasteurization, or to 280° F. for 2 seconds for Ultra pasteurization. After pasteurization, the composition is cooled to 40° F. or 35° F., packaged in aerosol containers and gassed with nitrous oxide. Packaging is performed by filling aerosol containers (14 ounces) with 396 grams of composition. The aerosol containers' nozzles are then crimped and 10 grams of nitrous oxide are injected into each container at 150 psi.

The containers are shaken for 30 seconds to disperse the nitrous oxide. Then the containers stand for 24 hours at 30° F. or 40° F.

The preferred method of producing the milk-based topping composition is as follows: the whole milk is heated to 110° F. in a liquefier with high speed agitation (900 rpm) and is blended with AVICEL™ RC-591 for 7-10 minutes at 110° F. to activate the cellulose of the AVICEL in 4-5 micron particles in order to stabilize the fat micelles and simulate fat. The agitation is slowed to about 450 rpm while the temperature is maintained at 110° F. and the MALTRIN® 10 is added. The composition is then slowly heated to about 130° F. When 130° F. is reached, the lecithin is added. The temperature is then ramped to 170° F. While ramping, the salt and annatto are added. After the composition is held at 170° F. for 30 minutes, it is transferred once through a homoaenizer at 1500 psi. The composition is then transferred to a kettle and cooled to 80° F. After 80° F. is reached, the natural butter flavoring is added. The composition is then packaged by filling aerosol containers (14 ounces) with 396 grams of composition. The aerosol container nozzles are then crimped and 10 grams of nitrous oxide are injected into each container at 150 psi. The containers are shaken for 30 seconds to disperse the nitrous oxide. Then the containers stand for 24 hours at 40° F.

In use, the aerosol container is inverted and the nozzle is pressed for one second to release a serving of the topping. Upon release from the container, the topping serving has a weight of approximately 1.75-3.0 grams, a diameter of approximately 2 inches, and a flavor strength of at least twice that of conventional butter.

The following examples demonstrate preferred embodiments of the topping compositions:

EXAMPLE 1

A water-based low-calorie low-fat butter-flavored topping composition comprising:

| Component | Weight % of Composition |
| --- | --- |
| Water | 66.142 |
| Coconut fat | 14.000 |
| MALTRIN10 | 12.000 |
| Milk powder | 2.600 |
| Whey | 2.600 |
| Salt | 1.710 |
| AVICEL RC-591 | 0.370 |
| DURTAN 60 | 0.297 |
| DUREM117 | 0.095 |
| DURFAX | 0.053 |
| Lecithin | 0.053 |
| Natural Butter Flavoring | 0.050 |
| Annatto color | 0.030 |

EXAMPLE 2

A milk-based low-calorie low-fat butter-flavored topping composition comprising:

| Component | Weight % of Composition |
| --- | --- |
| Whole milk (3.2% fat) | 52.800 |
| Heavy cream (38% fat) | 33.000 |
| Maltrin 10 | 12.000 |
| Salt | 1.710 |
| AVICEL RC-591 | 0.370 |
| Lecithin | 0.050 |
| Natural Butter Flavoring | 0.040 |
| Annatto color | 0.030 |

While the principles of this invention have been described in connection with specific embodiments and examples, it should be understood clearly that these descriptions are made only by way of example and are not intended to limit the scope of the invention.

The invention claimed is:

1. A packaged butter-flavored topping product comprising:
   a pressurized container; and
   a refrigerated butter-flavored topping composition within and dispensable from the pressurized container comprising:
   more than about 50% by weight water;
   about 13-16% by weight fat;
   about 0.02- to less than about 4% by weight emulsifier;
   about 10-16% by weight bulking agent;
   about 1-5% by weight milk powder;
   about 1-5% by weight protein; and
   butter flavoring in an amount sufficient to impart a butter flavor to the topping composition,
   whereby the topping composition has an overrun of about 250-350% when dispensed from the pressurized container.

2. The topping product of claim 1, whereby the topping composition stands up for at least 10 minutes at room temperature after being dispensed from the pressurized container.

3. The topping product of claim 1, whereby the composition is packaged in the pressurized container such that operation of the pressurized container allows removal of over 90% of the topping composition.

4. The topping product of claim 3 wherein the pressurized container is pressurized with nitrous oxide.

5. The topping product of claim 1 wherein the protein is selected from cheese whey and hydrogenated soy powder.

6. The topping product of claim 1 wherein the bulking agent comprises starch hydrolyzates.

7. The topping product of claim 6 wherein the bulking agent is a hydrolysed corn starch with a DE of about 10.

8. The topping product of claim 1 wherein the fat comprises coconut fat.

9. The topping product of claim 8 wherein the coconut fat has a melting point of about 92° F.

10. The topping product of claim 1 wherein the butter flavoring comprises:
    about 46% by weight propylene glycol;
    about 25.5% by weight lactic acid;
    about 20.2% by weight acetoin;
    about 4.2% by weight butyric acid;
    about 2.6% by weight diacetyl;
    about 0.8% by weight maltol; and
    about 0.7% by weight gamma-nonalactone.

11. The topping product of claim 1 wherein the topping composition comprises:
    over 60% by weight water;
    between about 14-15% by weight fat;
    between about 12-14% by weight bulking agent;
    between about 2-3% by weight milk powder;

between about 2-3% by weight protein; and
between about 0.03-0.06% by weight butter flavoring.

12. The topping product of claim 11 wherein the topping composition comprises:
about 66% by weight water;
about 14% by weight fat;
about 12% by weight bulking agent;
about 2.6% by weight milk powder;
about 2.6% by weight protein; and
between about 0.04-0.05% by weight butter flavoring.

13. The topping product of claim 1 wherein the topping composition comprises:
less than about 1% by weight nonionic, lipophilic emulsifier;
less than about 1% by weight nonionic, hydrophilic emulsifier;
less than about 1% by weight other emulsifier;
less than about 1% by weight lecithin;
less than about 1% by weight cellulose gel;
between about 1-2% by weight salt; and
less than about 1% by weight coloring.

14. The topping product of claim 13 wherein the topping composition comprises:
about 0.37% by weight cellulose gel;
about 0.297% by weight nonionic lipophilic emulsifier;
about 0.053% by weight nonionic hydrophilic emulsifier;
about 0.053% by weight lecithin;
about 0.095% by weight other emulsifier;
about 1.71% by weight salt; and
about 0.03% by weight coloring.

15. The topping product of claim 13 wherein the cellulose gel is microcrystalline cellulose, the nonionic lipophilic emulsifier is sorbitan monostearate, the nonionic hydrophilic emulsifier is polysorbate 60, the other emulsifier is mono-diglyceride and the coloring is annatto.

16. The topping product of claim 1 wherein the emulsifier is selected from lecithin, monodiglycerides of fatty acids, sorbitan monostearate, polyethylene sorbitan monostearate, food grade mono and diglycerides derived from vegetable oil, and monodiglyceride derived from soybean oil and combinations thereof.

17. The topping product of claim 1 wherein the butter flavoring is present in an amount of less than about 1% by weight.

18. A packaged butter-flavored topping product comprising:
a pressurized container; and
a refrigerated butter-flavored topping composition within and dispensable from the pressurized container comprising:
more than about 50% by weight water;
over 40% by weight whole milk;
Over 25% by weight heavy cream;
about 10-16% by weight bulking agent;
less than about 1% by weight butter flavoring; and
the topping composition having a fat content of about 13-16% by weight and an overrun of about 250-350%.

19. The topping product of claim 18 wherein the bulking agent comprises starch hydrolyzates.

20. The topping product of claim 19 wherein the bulking agent comprises a hydrolyzed corn starch with a DE of about 10.

21. The topping product of claim 18 wherein the butter flavoring comprises:
about 46% by weight propylene glycol;
about 25.5% by weight lactic acid;
about 20.2% by weight acetoin;
about 4.2% by weight butyric acid;
about 2.6% by weight diacetyl;
about 0.8% by weight maltol; and
about 0.7% by weight gamma-nonalactone.

22. The topping product of claim 18 wherein the topping composition comprises:
over 50% by weight whole milk;
over 30% by weight heavy cream;
between about 11-13% by weight bulking agent; and
between about 0.03-0.05% by weight butter flavoring.

23. The topping product of claim 22 wherein the topping composition comprises:
about 52.8% by weight whole milk;
about 33% by weight heavy cream;
about 12% by weight bulking agent; and
about 0.04% by weight butter flavoring.

24. The topping product of claim 18 wherein the topping composition further comprises:
less than about 2% by weight salt;
less than about 1% by weight cellulose gel;
less than about 0.5% by weight lecithin; and
less than about 0.5% by weight coloring.

25. The topping product of claim 24 wherein the topping composition comprises:
about 1.7% by weight salt;
about 0.37% by weight cellulose gel;
about 0.05% by weight lecithin; and
about 0.03% by weight coloring.

26. The topping product of claim 24 wherein the cellulose gel is microcrystalline cellulose and the coloring is annatto.

27. A packaged butter-flavored topping product comprising:
a pressurized container; and
a refrigerated butter-flavored topping composition within and dispensable from the pressurized container comprising:
over 50% by weight water;
between about 13-16% by weight fat;
between about 10-16% by weight bulking agent;
between about 1-5% by weight milk powder;
between about 1-5% by weight protein; and
less than about 1% by weight butter flavoring,
whereby the topping composition exhibits between about 250-350% overrun when dispensed from the pressurized container.

28. The topping product of claim 27 whereby the topping composition stands up for at least 10 minutes at room temperature after being emitted from the pressurized container.

29. A packaged milk-based butter-flavored topping comprising:
a pressurized container; and
a refrigerated butter-flavored topping composition within and dispensable from the pressurized container comprising:
over 40% by weight whole milk;
over 25% by weight heavy cream;
between about 10-16% by weight bulking agent; and
less than about 1% by weight butter flavoring,
whereby the topping composition has a fat content of about 13-16% by weight and exhibits between about 250-350% overrun when dispensed from the pressurized container.

30. The topping product of claim 29 whereby the topping composition stands up for at least 10 minutes at room temperature after being dispensed from the pressurized container.

31. The topping product of claim 29 wherein the heavy cream has a fat content of about 38% and the whole milk has a fat content of about 3.2%.

32. A packaged butter-flavored topping product comprising:
- a pressurized container; and
- a refrigerated butter-flavored topping composition within and dispensable from the pressurized container comprising:
  - about 50% by weight or more water;
  - about 13-16% by weight fat;
  - emulsifier in an amount sufficient to provide the topping composition with an overrun of about 250-350% when the topping composition is dispensed from the pressurized container;
  - about 10-16% by weight bulking agent;
  - protein in an amount sufficient for foaming of the composition; and
  - butter flavoring in an amount sufficient to impart a butter flavor to the topping composition.

33. The topping product of claim 32 wherein the fat comprises coconut fat.

34. The topping product of claim 32 wherein the emulsifier is selected from lecithin, monodiglycerides of fatty acids, sorbitan monostearate, polyethylene sorbitan monostearate, food grade mono and diglycerides derived from vegetable oil, and monodiglyceride derived from soybean oil and combinations thereof.

35. The topping product of claim 34 wherein the emulsifier is present in an amount of about 0.02 to less than about 4% by weight.

36. The topping product of claim 32 wherein the bulking agent comprises starch hydrolyzates.

37. The topping product of claim 36 wherein the bulking agent comprises a hydrolysed corn starch with a DE of about 10.

38. The topping product of claim 32 wherein the protein is present in an amount of about 1-5% by weight.

39. The topping product of claim 38 wherein the protein is selected from whey and hydrogenated soy powder.

40. The topping product of claim 32 wherein the butter flavoring is present in an amount of less than about 1% by weight.

41. The topping product of claim 39 wherein the butter flavoring comprises:
- about 46% by weight propylene glycol;
- about 25.5% by weight lactic acid;
- about 20.2% by weight acetoin;
- about 4.2% by weight butyric acid;
- about 2.6% by weight diacetyl;
- about 0.8% by weight maltol; and
- about 0.7% by weight gamma-nonalactone.

42. The topping product of claim 32 wherein:
- the topping composition has an overrun of about 250-350% once dispensed from the pressurized container; and
- the topping composition stands up for at least 10 minutes at room temperature once dispensed from the pressurized container.

* * * * *

UNITED STATES PATENT AND TRADEMARK OFFICE
CERTIFICATE OF CORRECTION

PATENT NO.         : 7,368,143 B2
APPLICATION NO.    : 10/646609
DATED              : May 6, 2008
INVENTOR(S)        : Buhler et al.

It is certified that error appears in the above-identified patent and that said Letters Patent is hereby corrected as shown below:

In column 4, lines 18-42, delete the paragraph beginning with "The invention further includes …" and ending with "… before pasteurizing." and insert the following paragraph:

--The invention further includes a method of preparing a water-based low-calorie low-fat butter-flavored topping composition. Such method comprises forming a first mixture by blending less than about 1 part cellulose gel (preferably microcrystalline cellulose) with water to form a hydrated gel, mixing in about 1-5 parts milk powder, mixing in about 1-5 parts protein (preferably cheese whey or hydrogenated soy powder), mixing in the balance of the water, mixing in about 10-16 parts bulking agent (preferably starch hydrolyzates), and heating the first mixture to over 100°F (preferably to about 130°F); forming a second mixture by melting about 13-16 parts fat (preferably coconut fat), and mixing in less than about 1 part nonionic lipophilic emulsifier (preferably DURTAN™ 60), less than about 1 part nonionic hydrophilic emulsifier (preferably polysorbate 60), less than about 1 part lecithin and less than about 1 part other emulsifier (preferably monodiglyceride) into the fat; mixing the first mixture and the second mixture to form the composition; adding less than about 2 parts salt and less than about 1 part flavoring to the composition; pasteurizing the composition; cooling the composition to less than 50°F (preferably to about 40°F or to about 35°F); and packaging the composition. The method preferably further includes adding coloring (preferably annatto) to the composition before pasteurizing.--.

UNITED STATES PATENT AND TRADEMARK OFFICE
CERTIFICATE OF CORRECTION

PATENT NO. : 7,368,143 B2
APPLICATION NO. : 10/646609
DATED : May 6, 2008
INVENTOR(S) : Buhler et al.

It is certified that error appears in the above-identified patent and that said Letters Patent is hereby corrected as shown below:

In column 4, line 48 through column 5, line 5, delete the paragraph beginning with "The invention further includes ..." and ending with "... before pasteurizing." and insert the following paragraph:

--The invention further includes a method of preparing a milk-based low-calorie low-fat butter-flavored topping composition. Such method comprises mixing more than 40 parts whole milk with less than 1 part cellulose gel (preferably microcrystalline cellulose), mixing in about 10-16 parts bulking agent (preferably starch hydrolyzates), mixing in more than 25 parts heavy cream, mixing in less than 0.5 parts lecithin, homogenizing the resulting composition, and packaging the composition. The method preferably includes heating the more than 40 parts whole milk to over 90°F (preferably to about 110°F), mixing in the less than 1 part cellulose gel, mixing in the about 10-16 parts bulking agent, heating to over 120°F (preferably to about 130°F), mixing in the more than 25 parts heavy cream, mixing in the less than 0.5 parts lecithin, heating to over 160°F (preferably to about 170°F), mixing in less than 2 parts salt and less than 0.5 parts coloring while heating, passing through a homogenizer at 1500 psi after holding temperature above 160°F (preferably at about 170°F) for 30 minutes, cooling to less than 90°F (preferably to about 80°F), adding less than 1 part flavoring, and packaging.--.

In column 8, line 35, delete "ganima-nonalactone" and insert --gamma-nonalactone--.

In column 9, line 17, delete "homoaenizer" and insert --homogenizer--.

Signed and Sealed this

Twelfth Day of May, 2009

JOHN DOLL
*Acting Director of the United States Patent and Trademark Office*